(12) United States Patent
Okano et al.

(10) Patent No.: US 10,261,404 B2
(45) Date of Patent: Apr. 16, 2019

(54) DISPLAY DEVICE AND CONTROL METHOD

(71) Applicant: SEIKO EPSON CORPORATION, Tokyo (JP)

(72) Inventors: Shuji Okano, Oita (JP); Munemasa Tatsukawa, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/854,469

(22) Filed: Dec. 26, 2017

(65) Prior Publication Data

US 2018/0196339 A1    Jul. 12, 2018

(30) Foreign Application Priority Data

Jan. 11, 2017 (JP) ................. 2017-002380

(51) Int. Cl.
| | |
|---|---|
| G03B 21/26 | (2006.01) |
| G03B 21/14 | (2006.01) |
| H04N 9/31 | (2006.01) |
| G03B 21/28 | (2006.01) |
| H04L 29/08 | (2006.01) |
| H04N 5/74 | (2006.01) |
| G03B 21/13 | (2006.01) |

(52) U.S. Cl.
CPC ............ *G03B 21/28* (2013.01); *G03B 21/26* (2013.01); *H04L 67/18* (2013.01); *H04N 5/74* (2013.01); *H04N 9/3147* (2013.01); *G03B 21/13* (2013.01)

(58) Field of Classification Search
CPC .. H04N 9/3147; H04N 9/3179; H04N 9/3194; H04N 5/74; G03B 21/14; G03B 21/26; G03B 21/00; H04L 67/18
See application file for complete search history.

(56) References Cited

U.S. PATENT DOCUMENTS

| | | | |
|---|---|---|---|
| 8,086,704 | B2 | 12/2011 | Honma |
| 9,743,052 | B2 | 8/2017 | Fukuchi |
| 2005/0157218 | A1 | 7/2005 | Honma |
| 2011/0082903 | A1 | 4/2011 | Honma |

(Continued)

FOREIGN PATENT DOCUMENTS

| | | |
|---|---|---|
| JP | 2007-43725 A | 2/2007 |
| JP | 2009-086484 A | 4/2009 |

(Continued)

*Primary Examiner* — Ryan D Howard
(74) *Attorney, Agent, or Firm* — Oliff PLC

(57) ABSTRACT

A first projector device includes: a positional information obtaining unit that obtains first positional information of a second projector device and second positional information of a third projector device by obtaining positional information indicating a positional relationship with a communication partner through communication; a selection screen generating unit that generates a selection screen for selecting at least one from a plurality of the projector devices; and a projection unit that displays the selection screen. The selection screen generating unit determines, based on the first positional information and the second positional information, a first position where the second projector device is selectably displayed and a second position where the third projector device is selectably displayed on the selection screen.

10 Claims, 5 Drawing Sheets

(56) References Cited

U.S. PATENT DOCUMENTS

| | | | | |
|---|---|---|---|---|
| 2014/0347497 A1* | 11/2014 | Fukuchi | ............... | H04N 9/3147 348/180 |
| 2015/0244998 A1* | 8/2015 | Yanazume | ........... | H04N 9/3185 348/38 |
| 2016/0291919 A1* | 10/2016 | Kurota | ................. | G06F 3/1446 |

FOREIGN PATENT DOCUMENTS

| | | | |
|---|---|---|---|
| JP | 2012-039184 | A | 2/2012 |
| JP | 2014-228617 | A | 12/2014 |
| JP | 2015-161830 | A | 9/2015 |
| JP | 2017-116689 | A | 6/2017 |

* cited by examiner

DISPLAY DEVICE AND CONTROL METHOD

The entire disclosure of Japanese Patent Application No. 2017-002380, filed Jan. 11, 2017 is expressly incorporated by reference herein.

BACKGROUND

1. Technical Field

The present invention relates to a display device and a control method.

2. Related Art

In the related art, multi-projection has been known, in which one image input from the outside is divided into a plurality of images, a plurality of projector devices respectively project the plurality of divided images onto a screen, and thus the plurality of divided images are combined and displayed as one image on the screen.

In the multi-projection, it is necessary to set a master projector that sets regions into which the image is divided, and gives an instruction to other projector devices, and set a slave projector that follows the instruction from the master projector.

First, the projector device serving as the master projector searches the plurality of projector devices for the projector device that can be set as the slave projector through communication.

For example, as shown in JP-A-2007-43725, the master projector broadcasts a search signal, and the projector devices having received the search signal return a response signal to the search signal.

The master projector having received the response signal discloses the projector devices that can be selected as the slave projectors based on IP address information of the projector devices having transmitted the response signal. Hence, a user selects the projector device to be set as the slave projector from the disclosed projector devices.

However, the list is generated based on the IP address information, and the list does not reflect information on the position from the master projector to the projector device. Therefore, it is difficult to select the projector device that a proper positional relationship with the master projector from the list.

SUMMARY

An advantage of some aspects of the invention is to make easy to select a projector device that participates in multi-projection.

The invention can be implemented as the following forms or application examples.

Application Example 1

A display device according to this application example includes: a positional information obtaining unit that obtains first positional information of a first display device and second positional information of a second display device by obtaining positional information indicating a positional relationship with a communication partner through communication; a selection screen generating unit that generates a selection screen for selecting at least one from a plurality of display devices including the first display device and the second display device; and a display unit that displays the selection screen, wherein the selection screen generating unit determines, based on the first positional information and the second positional information, a first position where the first display device is selectably displayed and a second position where the second display device is selectably displayed on the selection screen.

According to this configuration, when the first positional information of the first display device and the second positional information of the second display device are obtained by obtaining the positional information indicating the positional relationship with the communication partner through communication, and the selection screen for selecting at least one from the plurality of display devices including the first display device and the second display device is generated and displayed, the first position where the first display device is selectably displayed and the second position where the second display device is selectably displayed on the selection screen can be determined based on the first positional information and the second positional information. Hence, since the positions displayed on the selection screen are determined based on the positional information of the display device, the display device that takes account of the positional relationship can be easily selected from the plurality of display devices from the selection screen.

Application Example 2

In the display device according to the application example, it is preferable that the selection screen generating unit obtains, based on the first positional information and the second positional information, a distance from the display device to the first display device and a distance from the display device to the second display device, and determines the first position and the second position so as to preferentially display one of the first display device or the second display device, the distance to which from the display device is shorter, on the selection screen.

According to this configuration, since the display device whose distance to the display device is short is preferentially displayed from the plurality of display devices on the selection screen, it becomes easy to select the display device that is located nearby.

Application Example 3

In the display device according to the application example, it is preferable that the selection screen generating unit obtains, based on the first positional information and the second positional information, a located position of the first display device and a located position of the second display device on the basis of the display device, displays information indicating the distance and the located position of the first display device in association with the first position on the selection screen, and displays information indicating the distance and the located position of the second display device in association with the second position on the selection screen.

According to this configuration, since the information indicating the distance of the display device and the located position of the display device is displayed in association with the determined position on the selection screen, it becomes easy to select the display device according to the distance or the located position.

Application Example 4

In the display device according to the application example, it is preferable that the selection screen includes an instruction unit for sorting the plurality of display devices based on the distances.

According to this configuration, the plurality of display devices can be sorted based on the distances on the selection screen.

Application Example 5

In the display device according to the application example, it is preferable that the display device further includes a control unit that obtains, based on the positional information, a distance from each of the plurality of display devices, and selects the display device whose distance obtained is shorter than a predetermined reference value.

According to this configuration, since the display device whose distance obtained shorter than the predetermined reference value can be selected, a proper display device can be selected without generating the selection screen.

Application Example 6

In the display device according to the application example, it is preferable that when the distance obtained is shorter than the predetermined reference value, the control unit selects the display device in ascending order of the distance until a predetermined reference number is reached.

According to this configuration, when the distance obtained is shorter than the predetermined reference value, the display, device is selected in ascending order of distance until the predetermined reference number is reached, and thus a proper display device can be rapidly selected.

Application Example 7

In the display device according to the application example, it is preferable that the positional information obtaining unit communicates with the communication partner using an electromagnetic wave as a transmission medium, and obtains the positional information based on propagation characteristics of the electromagnetic wave.

According to this configuration, since the positional information is obtained based on the propagation characteristics of the electromagnetic wave, the position can be accurately obtained.

Application Example 8

A control method according to this application example includes: obtaining first positional information of a first display device and second positional information of a second display device by obtaining positional information indicating a positional relationship with a communication partner through communication; determining, based on the first positional information and the second positional information, a first position where the first display device is selectably displayed and a second position where the second display device is selectably displayed; generating, based on the first position and the second position, a selection screen for selecting at least one from a plurality of display devices including the first display device and the second display device; and displaying the selection screen generated.

According to the method, when the first positional information of the first display device and the second positional information of the second display device are obtained by obtaining the positional information indicating the positional relationship with the communication partner through communication, and the selection screen for selecting at least one from the plurality of display devices including the first display device and the second display device is generated and displayed, the first position where the first display device is selectably displayed and the second position where the second display device is selectably displayed on the selection screen can be determined based on the first positional information and the second positional information. Hence, since the positions displayed on the selection screen are determined based on the positional relationship with the first display device and the second display device, the display device that tales account of the positional relationship can be easily selected from the plurality of display devices from the selection screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Embodiment

A display device according to the embodiment will be described below with reference to the drawings.

Figure 1:
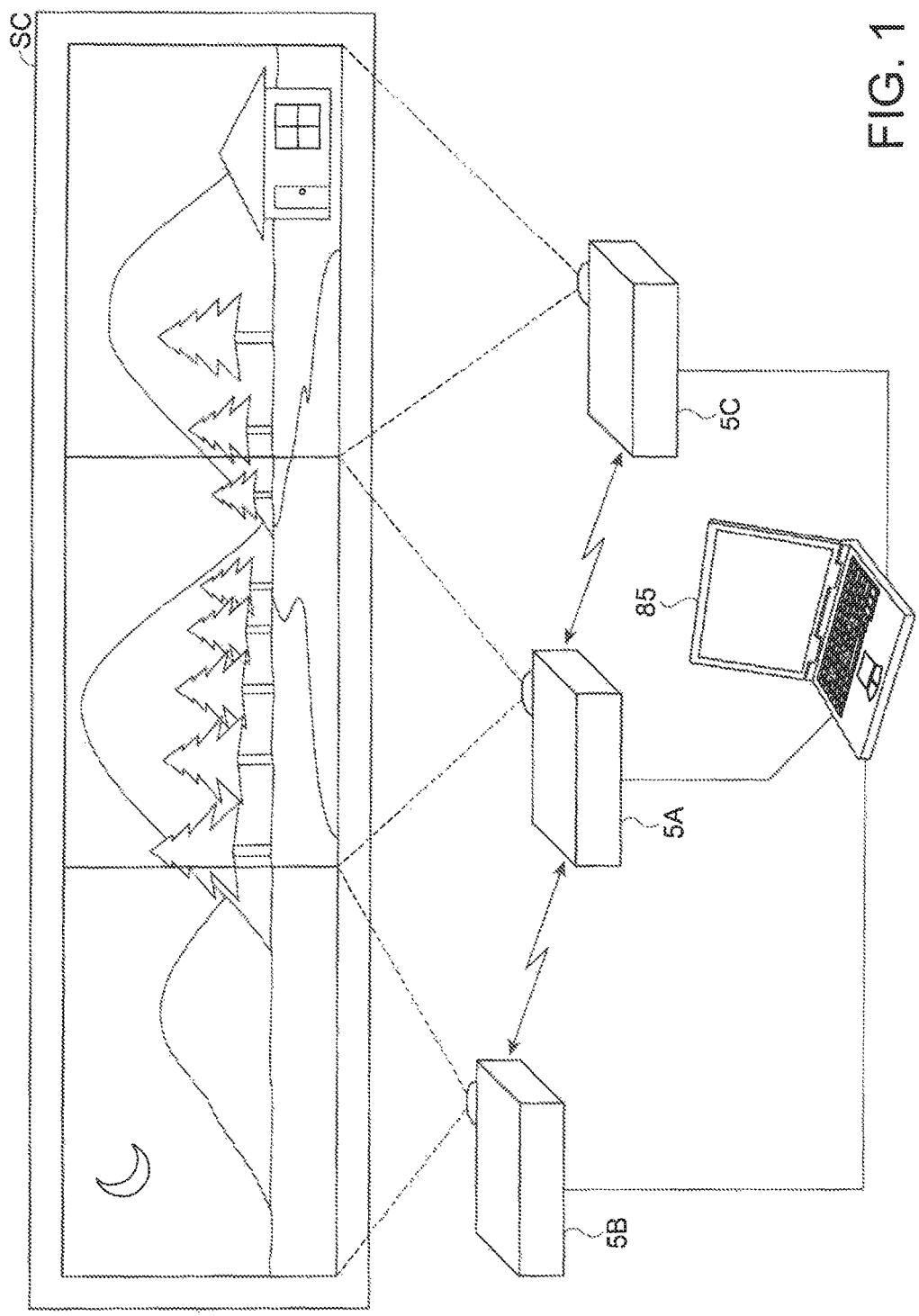
FIG. 1 is a diagram showing an outline of multi-projection performed by a plurality of projector devices according to an embodiment.

FIG. 1 is a diagram showing an outline of the form (multi-projection system) in which images are projected using a plurality of projector devices 5 each of which is one example of the display device and thus combined into one image.

In this form, each of three projector devices 5A, 5B, and 5C projects a portion of an image to be projected, in a divided manner, onto a screen SC. The projected images are combined on the screen SC to form one connected image. The Projector device 5B corresponds to a first display device, and the projector device 5C corresponds to a second display device.

The projector devices 5A, 5E, and 5C are each connected through communication with an image supply device 85 that supplies image data of the image to be projected. The image supply device 85 is contemplated to be a video playback device, a DVD (Digital Versatile Disk) playback device, a Blu-ray (registered trademark) Disc playback device, a hard disk recorder, or the like. Moreover, the image supply device 85 may be a video output device such as a television tuner device, a CATV (cable television) set-top box, or a video game machine, or may be a personal computer.

The projector devices 5A, 5B, and 5C can wirelessly communicate with each other.

In the embodiment, the three projector devices 5A, 5B, and 5C form one connected image; however, the multi-projection system may be configured using more than three projector devices.

Figure 2:
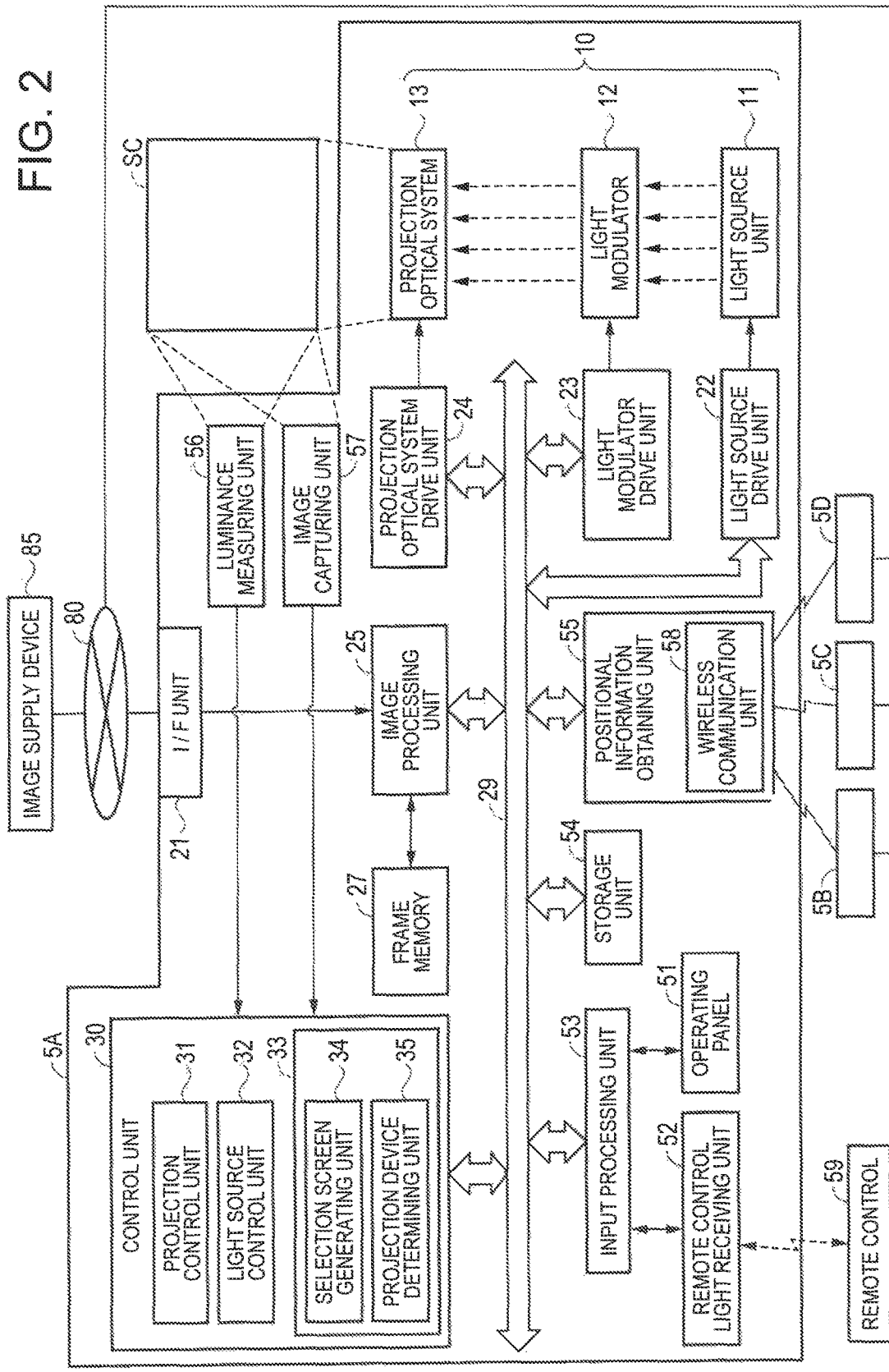
FIG. 2 is a block diagram of a projector device.

FIG. 2 is a block diagram of the projector device 5A. In FIG. 2, the multi-projection system is configured using four projector devices 5A, 5B, 5C, and 5D. The projector devices 5A, 5B, 5C, and 5D have the same configuration, and therefore, the projector device 5A will be described as an example.

The projector device 5A includes an I/F (interface) unit 21 that obtains image data from the image supply device 85. In the embodiment, the I/F unit 21 is contemplated to be a LAN interface that performs communication through a network 80; however, the I/F unit 21 is not limited to this. For example, the I/F unit 21 can be contemplated to be a DVI interface, a USB interface, or the like. Moreover, the I/F unit 21 may be, for example, an S-video terminal to which a composite video signal such as NTSC, PAL, or SECAM is input, an RCA terminal to which the composite video signal is input, a D-terminal to which a component video signal is input, or the like. Further, the I/F unit 21 can be contemplated to be an interface such as HDMI (registered trademark), DisplayPort (registered trademark), CoaXPress (registered trademark).

The I/F unit 21 may be configured such that the I/F unit 21 includes an A/D conversion circuit to convert an analog video signal to a digital image data and is connected to the image supply device 85 through an analog video terminal such as a VGA terminal. Moreover, the I/F unit 21 may perform transmission and reception through wire communication, or may perform transmission and reception through wireless communication.

The projector device 5A roughly includes a projection unit (display unit) 10 that forms an optical image and projects the optical image onto the screen SC as a projection surface, and an image processing system that electrically processes the image to be displayed by the projection unit 10. First, the projection unit 10 will be described.

The projection unit 10 includes a light source unit 11, a light modulator 12, and a projection optical system 13. The projection unit 10 projects an image onto the screen SC.

The light source unit 11 includes a light source composed of a xenon lamp, an extra-high-pressure mercury lamp, an LED (Light Emitting Diode), or the like. The light source unit 11 may be configured to include a reflector and an auxiliary reflector that direct light emitted by the light source to the light modulator 12. Moreover, the light source unit 11 may include, for example, a lens group (not shown) for enhancing the optical characteristics of projection light, a polarizer, or a dimming element that reduces the amount of light emitted by the light source on a path reaching the light modulator 12.

The light modulator 12 includes, for example, three transmissive liquid crystal panels corresponding to three primary colors of RGB, and modulates each light that passes through the liquid crystal panel to generate image light. The light from the light source unit 11 is split into three color lights of RGB, and the respective color lights are incident on the corresponding liquid crystal panels. The color lights transmitted through the liquid crystal panels and thus modulated are combined by a combining optical system such as a cross dichroic prism, and the combined light is emitted to the projection optical system 13.

The projection optical system 13 includes, for example, a zoom lens that performs the enlargement and reduction, and the adjustment of focus, of an image to be projected, and a focus adjusting mechanism that performs a focus adjustment. The projection optical system 13 projects the image light modulated by the light modulator 12 onto the screen SC and forms an image thereon.

A light source drive unit 22, a light modulator drive unit 23, and a projection optical system drive unit 24 are connected to the projection unit 10.

The light source drive unit 22 drives the light source of the light source unit 11 according to the control of a control unit 30. The light modulator drive unit 23 drives, according to the control of the control unit 30, the light modulator 12 based on image data input from an image processing unit 25, and draws an image on the liquid crystal panel. The projection optical system drive unit 24 drives, according to the control of the control unit 30, each of motors included in the projection optical system 13.

The image processing system of the projector device 5A configured to mainly include the control unit 30 controlling the projector device 5A, and further includes a storage unit 54, the image processing unit 25, and a frame memory 27.

The control unit 30 includes hardware such as a CPU, a ROM, and a RAM (all not shown). The CPU executes a basic control program stored in the ROM, or a control program stored in the storage unit 54, so that the control unit 30 controls the projector device 5A. The control unit 30 functions as a projection control unit 31, a light source control unit 32, and a multi-projection control unit 33 by executing the control program stored in the storage unit 54. The projection control unit 31, the light source control unit 32, and the multi-projection control unit 33 will be described later.

The storage unit 54 is a rewritable non-volatile memory such as a flash memory or an EEPROM. The storage unit 54 stores the control program for controlling the operation of the projector device 5A, various setting data for defining operating conditions of the projector device 5A and multi-projection, and the like.

The image processing unit 25 obtains image data according to the control of the control unit 30, and determines attributes of the obtained image data, such as an image size or a resolution, whether it is a still image or a moving image, a frame rate if it is a moving image, and whether it is three-dimensional image data.

The image processing unit 25 develops the image data in the frame memory 27 for each frame, and executes image processing on the developed image data. The image processing executed by the image processing unit 25 includes, for example, resolution conversion, frame rate conversion, shape correction, zooming, color tone correction, and luminance correction. It is, of course, possible for the image processing unit 25 to execute two or more of the processes in combination.

The contents and parameters of the processes executed by the image processing unit 25, and the timing of the start and end of the process, are controlled by the control unit 30. The image processing unit 25 reads the processed image from the frame memory 27, generates image signals of R (red), G (green), and B (blue) corresponding to the image, and outputs the image signals to the light modulator drive unit 23.

An operating panel 51 including various switches and indicator lamps for a user to perform operations are disposed on a main body of the projector device 5A. The operating panel 51 is connected to an input processing unit 53. The input processing unit 53 causes, according to the control of the control unit 30, the indicator lamp of the operating panel 51 to be appropriately turned on, or flash on and off, in response to the operating state or setting state of the projector device 5A. When the switch of the operating panel 51 is operated, an operating signal corresponding to the operated switch is input to the control unit 30 via the input processing unit 53.

The projector device 5A also includes a remote control 59 used by the user. The remote control 59 includes various buttons, and transmits an infrared signal in response to the operation of the buttons. A remote control light receiving unit 52 that receives the infrared signal emitted by the remote control 59 is disposed on the main body of the projector device 5A.

The remote control light receiving unit 52 is connected to the input processing unit 53. The remote control light receiving unit 52 decodes the infrared signal received from the remote control 59, generates an operating signal indicating the operated content in the remote control 59, and outputs the operating signal to the input processing unit 53. The operating signal generated by the remote control light receiving unit 52 is input to the control unit 30 via the input processing unit 53.

When an instruction is issued using the remote control 59, a setting screen may have an on-screen display function in which the setting screen is displayed in the state of being superimposed on an image to be projected.

The projector device 5A may be operated from a smartphone or a tablet device, which is not shown in the drawing. That is, a communication signal relating to the operation of the projector device 5A may be generated on a smartphone or a tablet device, and the generated communication signal may be input from the I/F unit 21 to the control unit 30 through the network 80.

The projector device 5A includes a positional information obtaining unit 55. The positional information obtaining unit 55 includes a wireless communication unit 58. The wireless communication unit 58 has a function to exchange predetermined information through wireless communication with the other projector devices 5B, 5C, and 5D. Further, the wireless communication unit 58 has a function to obtain positional parameters relating to the distances to tree other projector device 5B, 5C, and 5D or the directions by communicating with the other projector devices 5B, 5C, and 5D.

The positional information obtaining unit 55 calculates, based on the positional parameters obtained by the wireless communication unit 58, positional information indicating the positional relationship with the other projection devices 5B, 5C, and 5D. The positional information of the projector device 5B corresponds to first positional information. The positional information of the projector device 5C corresponds to second positional information.

In the embodiment, the wireless communication unit 58 is contemplated to be a wireless communication interface that uses an electromagnetic wave as a transmission medium and executes wireless communication such as wireless LAN or Bluetooth (registered trademark).

The wireless communication unit 58 obtains the positional parameters utilizing the propagation characteristics of radio waves used in wireless LAN or Bluetooth (registered trademark).

For example, for information on the direction in the positional parameters, the direction may be specified by adopting a beamforming technique using WiFi (registered trademark) radio waves and by utilizing the directivity of an antenna.

For example, the projector device 5A may transmit radio waves having different phases, while changing the transmitting direction, and determine the direction of a sender based on the intensity of the radio waves at the received place.

Moreover, the projector device 5A may transmit a first reference signal from a nondirectional antenna, and transmit a second reference signal from a directional antenna while periodically changing the transmitting direction according to the passage of time. The projector devices 5B, 5C, and 5D may transmit information on the time from the reception of the first reference signal to the reception of the second reference signal to the projector device 5A, and the projector device 5A may determine the directions in which the projector devices 5B, 5C, and 5D are located based on the information on the time.

For information on the distance in the positional parameters, a Chronos technique in which the position is specified utilizing WiFi (registered trademark) radio waves may be adopted.

Moreover, a method based on the time of arrival of radio waves may be adopted. For example, the projector device 5A transmits the first reference signal, and the projector devices 5B, 5C, and 5D having received the first reference signal transmit the second reference signal. In this manner, the distance may be calculated based on the time required from when the projector device 5A transmits the first reference signal until when the projector device 5A receives the second reference signal.

Moreover, utilizing the fact that a radio field intensity is attenuated according to a communicating distance, the projector devices 5B, 5C, and 5D may receive a radio signal from the projector device 5A, and the distance may be calculated based on the intensity of the received radio signal.

The light source drive unit 22, the light modulator drive unit 23, the projection optical system drive unit 24, the image processing unit 25, the control unit 30, input processing unit 53, the storage unit 54, and the positional information obtaining unit 55 are connected to a communication bus 29, and perform data communication with the control unit 30 via the communication bus 29.

The projector device 5A also includes a luminance measuring unit 56 and an image capturing unit 57. The luminance measuring unit 56 measures the luminance of the screen SC. The luminance measuring unit 56 outputs luminance information indicating the measured luminance of the screen SC to the control unit 30.

The image capturing unit 57 captures an image of the screen SC, and outputs the captured image to the control unit 30.

Next, the processes of the functional blocks of the control unit 30 will be described.

The projection control unit 31 controls, based on operating data input from the input processing unit 53, each unit to project image data onto the screen SC. For example, the projection control unit 31 generates parameters for causing the image processing unit 25 to execute image processing, and outputs the parameters to the image processing unit 25.

The light source control unit 32 controls the light source unit 11 to switch the light source unit 11 between on and off when the projection of an image is started.

The multi-projection control unit 33 includes a selection screen generating unit 34 and a projection device determining unit 35.

When multi-projection is performed with the projector device 5A as a master projector, the selection screen generating unit 34 extracts the projector devices 5B, 5C, and 5D that are selectable as slave projectors, and generates a selection screen 90 (FIG. 5) for selecting a slave projector from the projector devices 5B, 5C, and 5D.

The selection screen generating unit 34 generates the selection screen 90 (FIG. 5) based on the positional information on the other projector devices 5B, 5C, and 5D calculated by the positional information obtaining unit 55.

Figure 5:
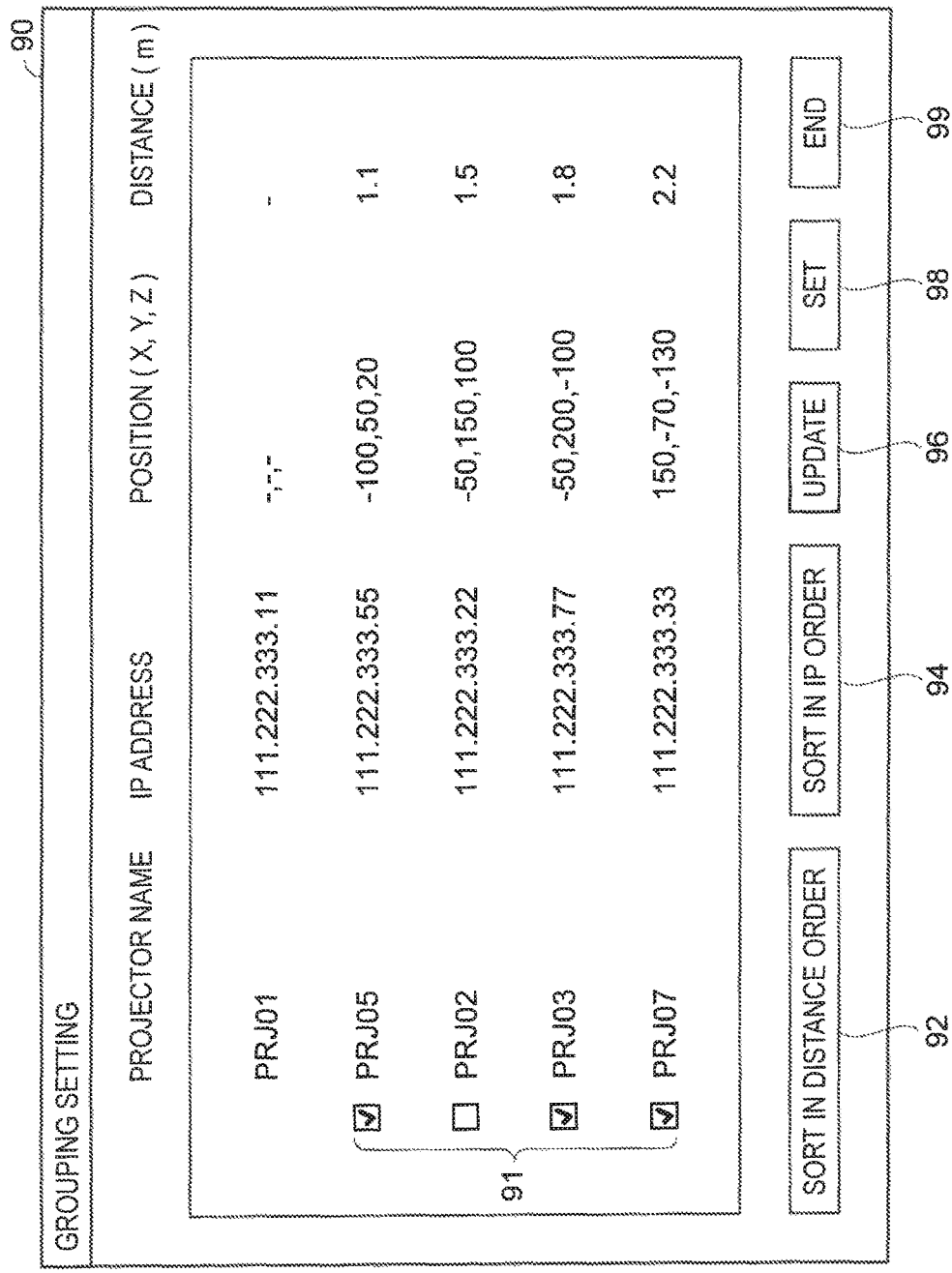
FIG. 5 is a diagram showing one example of a displayed selection screen.

For example, the selection screen generating unit 34 may sort the other projector devices 5B, 5C, and 5D in ascending order of distance from the projector device 5A, and generate the selection screen 90 (FIG. 5).

The selection screen 90 (FIG. 5) generated by the selection screen generating unit 34 may be displayed as a projection image on the screen SC, or may be displayed on the display screen of the operating panel 51 or the remote control 59. Moreover, the selection screen 90 may be displayed on the display screen of a smartphone or a tablet device as an external device.

The projection device determining unit 35 determines, based on a result of selection on the selection screen 90 (FIG. 5) generated by the selection screen generating unit 34, slave projector, with which the project or device 5A shares projection.

The multi-projection control unit 33 may automatically set the projector device 5 that meets a predetermined condition as the slave projector without instructing the selection screen generating unit 34 to generate the selection screen 90 (FIG. 5).

The multi-projection control unit 33 controls the selection screen generating unit 34 to cause the user to select the slave projectors, and also controls the slave projectors selected by the user to execute multi-projection.

For example, the multi-projection control unit 33 may cause the selected slave projectors to capture predetermined image projected by the projector device 5A, analyze the captured image to determine a share of the image to be projected by each of the slave projectors, and transmit information on the determined share to each of the slave projectors via the wireless communication unit 58.

In such multi-projection, for example the method disclosed in JP-A-2014-228617 can be adopted as a method of determining an image region to be shared and projected by each of the projector devices 5.

Figure 3:
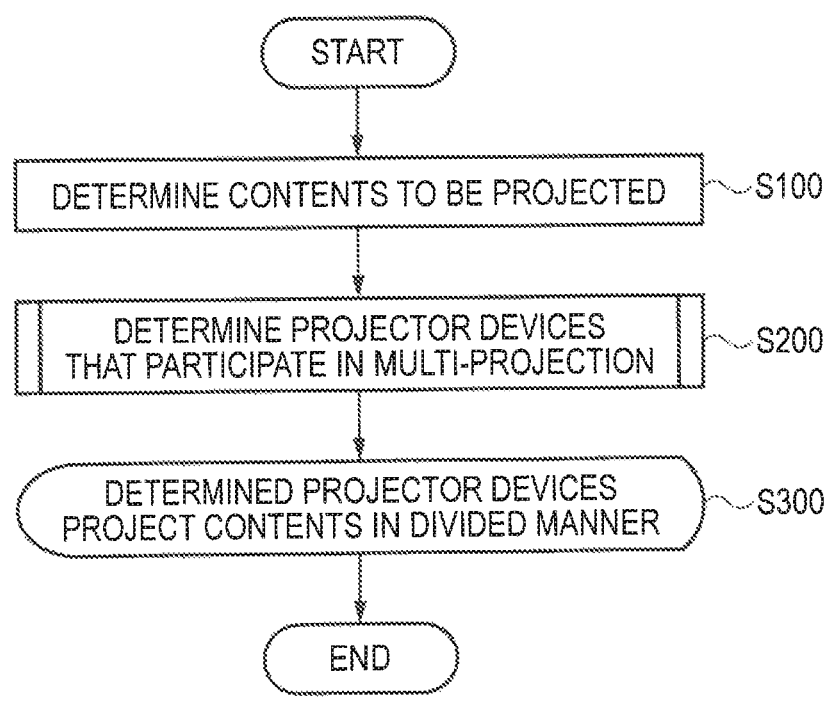
FIG. 3 is a flowchart showing the flow of processes when multi-projection is performed.

FIG. 3 is a flowchart showing the flow of processes when multi-projection is performed by the plurality of projector devices 5.

First, contents including an image to be projected as multi-projection are determined (Step S100). In the embodiment, the user may determine the contents by operating the image supply device 85.

Next, the projector devices 5 that participate in the multi-projection are determined (Step S200). In the embodiment, the user operates the projector device 5A serving as the master projector, and determines the slave projectors that participate in the multi-projection.

Figure 4:
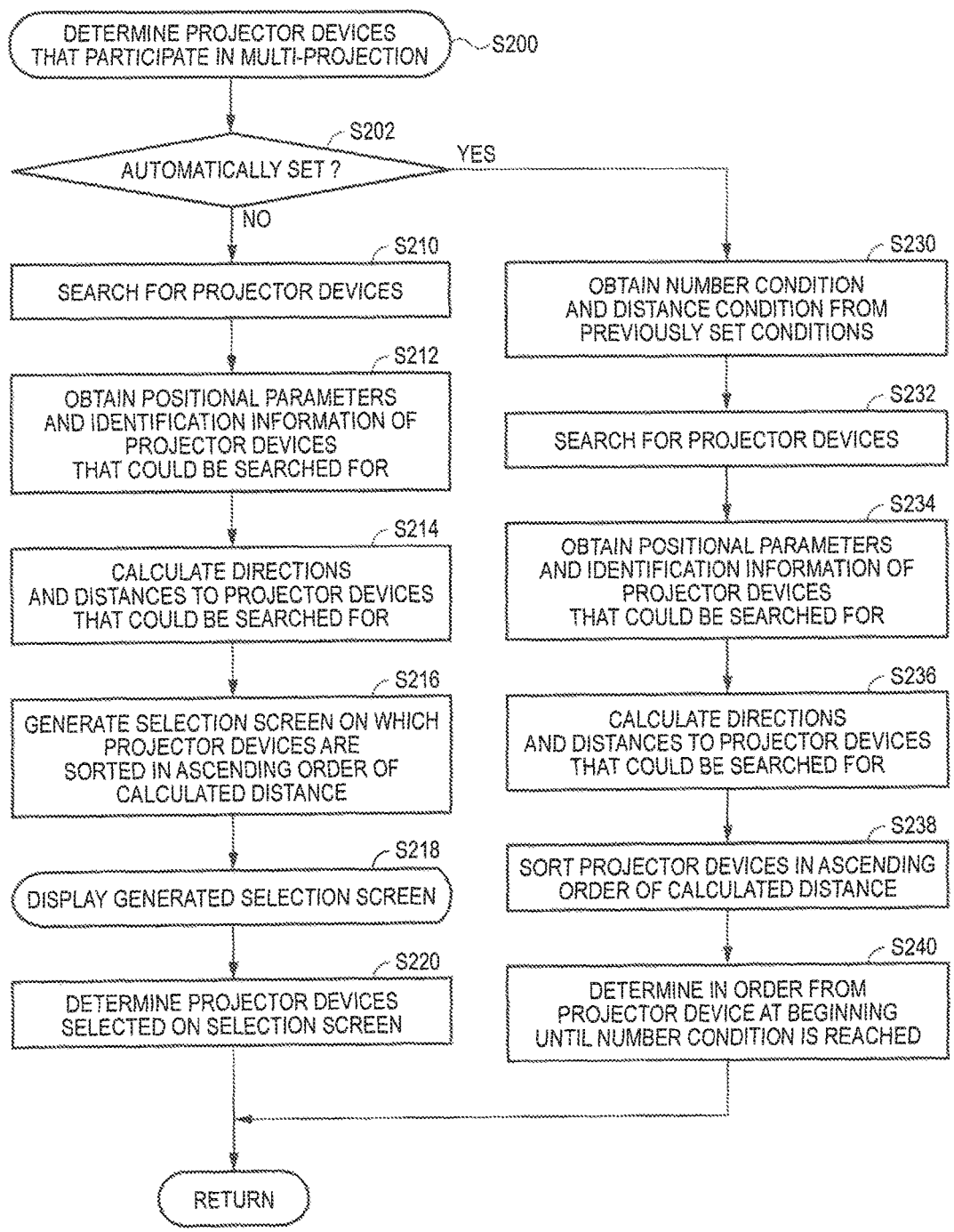
FIG. 4 is a flowchart showing the flow of the process for determining projector devices that participate in multi-projection.

Here, a detailed process (control method) in Step S200 will be described based on FIG. 4.

When this process is executed, the control unit 30 of the projector device 5A serving as the master projector determines whether the determination of the slave projectors is automatically set or not (Step S202).

In the embodiment, the form in which the user determines whether automatically set or not by operating the projector device 5 is contemplated.

First, a process when the determination is not automatically set (No in Step S202) will be described.

In this case, the control unit 30 of the projector device 5A searches for the projector devices 5 that are connectable (Step S210).

In the embodiment, the form in which searching is performed by broadcasting a predetermined search signal from the wireless communication unit 58 and receiving a response signal to the search signal by the wireless communication unit 58 is contemplated.

Next, the control unit 30 of the projector device 5A obtains the positional parameters and identification information of the projector devices 5 that could be searched for (Step S212).

The identification information is contemplated to be a name or IP address by which the projector device 5 can be uniquely identified.

Next, the control unit 30 of the projector device 5A calculates, based on the positional parameters of the projector device 5 that could be searched for, the direction in which the projector device 5 is located as viewed from the projector device 5A, and the distance (Step S214).

Next, the control unit 30 of the projector device 5A generates the selection screen 90 on which the projector device 5 having a shorter calculated distance is preferentially displayed (Step S216). For example, the control unit 30 generates the selection screen 90 on which the projector devices 5 are arranged in ascending order of the calculated distance. That is, the control unit 30 generates the selection screen 90 on which the projector devices 5 are arranged such that the projector device 5 having the shortest distance is at the beginning, and that as the calculated distance increases, the projector device 5 is located at a lower position (Step S216). Then, the selection screen 90 generated is displayed (Step 3218).

FIG. 5 shows one example of the selection screen 90 displayed. In the selection screen 90, the names and IP addresses of the projector devices 5 that could be searched for, and the positions and distances thereof on the basis of the projector device 5A, are displayed.

The information on the projector device 5A is displayed at the top, and the projector devices 5 that could be searched for are sequentially displayed in ascending order of distance from the projector device 5A. The position and distance of each of the projector devices 5, on the basis of the projector device 5A, are displayed in association with the position where each of the projector devices 5 is displayed.

A button 92 (corresponding to an instruction unit) for sorting the projector devices in a distance order, and a button 94 for sorting the projector devices in an IP order, are select ably displayed on the selection screen 90.

Check boxes 91 by which the projector devices 5 that could be searched for can be selected are displayed on the selection screen 90. The user can select the projector device 5 that participates in multi-projection by operating the check box 91.

Moreover, an update button 96 for instructing to search for the projector device 5 and update the selection screen 90, a setting button 98 for determining the projector device 5 that participates in multi-projection, and an end button 99 for ending the display of the selection screen 90 are displayed on the selection screen 90.

The user selects the projector device 5 displayed on the selection screen 90 using the check box 91, and presses down the setting button 98. Returning to FIG. 4, the control unit 30 of the projector device 5A determines the projector device 5 that participates in multi-projection (Step S220), and ends the process.

Next, a process when the determination is automatically set (Yes in Step S202) will be described.

In this case, the control unit 30 of the projector device 5A obtains a number condition and a distance condition of the projector devices 5 that participate multi-projection from previously set conditions (Step S230).

The number condition and the distance condition are contemplated to be, for example, conditions that three projector devices having short distances from the projector device 5A are caused to participate in multi-projection.

The conditions to be selected can be contemplated to be conditions that all of projector devices having distances within a reference distance are caused to participate in multi-projection, or conditions that up to four projector devices having distances falling within the reference range are caused to participate in multi-projection. Moreover, a located direction viewed from the projector device 5A may be added as a condition.

Next, the control unit 30 of the projector device 5A searches for the projector devices 5 that are connectable (Step S232).

Next, the control unit 30 of the projector device 5A obtains the positional parameters and identification information of the projector devices 5 that could be searched for (Step S234).

Next, the control unit 30 of the projector device 5A calculates, based on the positional parameters of the projector device 5 that could be searched for, the direction in which the projector device 5 is located as viewed from the projector device 5A, and the distance (Step S236).

Next, the control unit 30 of the projector device 5A sorts the projector devices 5 in ascending order of the calculated distance (Step S238).

Next, the control unit 30 of the projector device 5A determines the projector devices 5 that participate in multi-projection in ascending order of the calculated distance until the number condition is reached (Step S240), and ends the process.

Through the processes described above, the projector devices 5 that participate in multi-projection can be determined by the two methods.

Returning to FIG. 3, the projector devices 5 determined in Step S200 project the contents in a divided manner, and the contents are combined on the screen SC, so that a connected image of the contents is displayed (Step S300).

The positional relationship indicating the distances or directions between the projector devices 5 that participate in multi-projection, that is, between the projector device 5A serving as the master projector and the projector devices (for example, 5B, 5C) serving as the slave projectors, is calculated in Step S200; therefore, it unnecessary to newly obtain the positional relationship when the contents are projected in a divided manner in Step S300, and thus preparation for multi-projection can be rapidly made.

According to the embodiment described above, the following advantageous effects are provided.

(1) When the positional information of the projector device 5 is obtained by obtaining positional information indicating a positional relationship with a communication partner through communication, and the selection screen 90 for selecting at least one from the plurality of projector devices 5 is generated and displayed, the position where the projector device 5 is selectably displayed on the selection screen 90 can be determined based on the positional information. Hence, since the positions displayed on the selection screen 90 are determined based on the positional relationship with the projector device 5, the projector device 5 that takes account of the positional relationship can be easily selected from the plurality of projector devices 5 from the selection screen 90 displayed.

(2) Since the projector device 5 having a short distance is preferentially displayed from the plurality of projector devices 5 on the selection screen 90, it becomes easy to select the projector device 5 that is located nearby.

(3) Since information indicating the distance to the projector device 5 and a located position is displayed in association with the determined position on the selection screen 90, it becomes easy to select the projector device 5 according to the distance or the located position.

(4) The plurality of projector devices 5 can be sorted based on the distance on the selection screen 90.

(5) When a calculated distance is shorter than a predetermined reference value, the process for generating the selection screen 90 becomes unnecessary by selecting the projector device 5 having the short distance, and thus the projector device 5 can be rapidly selected.

(6) When a calculated distance is shorter than the predetermined reference value, the projector device 5 suitable for multi-projection can be easily selected by selecting the projector devices 5 in ascending order of distance until a predetermined reference number is reached.

Although the invention has been described based on the embodiment shown in the drawings, the invention is not limited to the embodiment. Modified examples described below can also be contemplated.

(1) In addition to the information on the position and distance of the projector device 5, a projection direction in which the projection optical system 13 is directed may be obtained and displayed on the selection screen 90.

(2) The projector device 5 is not limited to the type of using a liquid crystal panel, but can be contemplated to be of other types such as a DLP (Digital Light Processing) type or a LCOS (Liquid Crystal On Silicon) type.

(3) The display device is not limited to the projector device 5 that projects an image onto the screen SC. The invention includes various display devices such as a liquid crystal monitor or liquid crystal television set that displays an image on a liquid crystal display panel, a monitor device or television receiver that displays an image on a PDP (plasma display panel), and a self-emitting display device such as a monitor device or television receiver that displays an image on an organic EL display panel called an OLED (Organic light-emitting diode), an OEL (Organic Electro-Luminescence), or the like.

A device that implements the method described above may be realized by a single device or may be realized by combining a plurality of devices, and includes various forms.

Each of the functional units of the control unit 30 shown in FIG. 2 represents a functional configuration realized by cooperation of hardware and software, and a specific mounting form is not particularly limited. Hence, hardware individually corresponding to the functional units does not need to be mounted, and it is, of course, possible to employ a configuration in which one processor executes programs to thereby realize the functions of the plurality of functional units. Moreover, a portion of the functions realized by software in the embodiment may be realized by hardware, or a portion of the functions realized by hardware may be realized by software.

What is claimed is:
1. A display device comprising:
a positional information obtaining unit that obtains first positional information of a first display device and second positional information of a second display device by obtaining positional information indicating a positional relationship with a communication partner through communication;

a selection screen generating unit that:
  generates a selection screen for selecting at least one from a plurality of display devices including the first display device and the second display device,
  obtains, based on the first positional information and the second positional information, a first distance from the display device to the first display device and a second distance from the display device to the second display device, and
  determines a first position where the first display device is selectably displayed on the selection screen and a second position where the second display device is selectably displayed on the selection screen, based on the first distance and the second distance; and
a display unit that displays the selection screen.

2. The display device according to claim 1, wherein the selection screen generating unit determines the first position and the second position so as to preferentially display the first display device or the second display device, the distance to which from the display device is shorter, on the selection screen.

3. The display device according to claim 2, wherein the selection screen generating unit:
  obtains, based on the first positional information and the second positional information, a first located position of the first display device and a second located position of the second display device with reference to the display device,
  displays information indicating the first distance and the first located position in association with the first position on the selection screen, and
  displays information indicating the second distance and the second located position in association with the second position on the selection screen.

4. The display device according to claim 2, wherein the selection screen includes an instruction unit for sorting the plurality of display devices based on distances.

5. The display device according to claim 1, further comprising:
  a control unit that obtains the first and second distances, and selects the display device whose distance obtained is shorter than a predetermined reference value.

6. The display device according to claim 5, wherein when the first or second distance is shorter than the predetermined reference value, the control unit selects the display device in ascending order of distance until a predetermined reference number is reached.

7. The display device according to claim 1, wherein the positional information obtaining unit communicates with the communication partner using an electromagnetic wave as a transmission medium, and obtains the positional information based on propagation characteristics of the electromagnetic wave.

8. A control method comprising:
  obtaining first positional information of a first display device and second positional information of a second display device by obtaining positional information indicating a positional relationship with a communication partner through communication;
  obtaining, based on the first positional information and the second positional information, a first distance from an object to the first display device and a second distance from the object to the second display device;
  determining, based on the first distance and the second distance, a first position where the first display device is selectably displayed and a second position where the second display device is selectably displayed;
  generating, based on the first position and the second position, a selection screen for selecting at least one from a plurality of display devices including the first display device and the second display device; and
  displaying the selection screen generated.

9. A display device comprising:
a positional information obtaining unit that obtains first positional information of a first display device and second positional information of a second display device by obtaining positional information indicating a positional relationship with a communication partner through communication;
a control unit that:
  obtains, based on the first positional information and the second positional information, a first distance from the display device to the first display device and a second distance from the display device to the second display device,
  selects the display device whose distance obtained is shorter than a predetermined reference value, and
  when the first or second distance is shorter than the predetermined reference value, selects the display device in ascending order of distance until a predetermined reference number is reached;
a selection screen generating unit that:
  generates a selection screen for selecting at least one from a plurality of display devices including the first display device and the second display device, and
  determines a first position where the first display device is selectably displayed on the selection screen and a second position where the second display device is selectably displayed on the selection screen, based on the first distance and the second distance; and
a display unit that displays the selection screen.

10. A display device comprising:
a positional information obtaining unit that obtains first positional information of a first display device and second positional information of a second display device by obtaining positional information indicating a positional relationship with a communication partner through communication using an electromagnetic wave as a transmission medium, based on propagation characteristics of the electromagnetic wave;
a selection screen generating unit that:
  generates a selection screen for selecting at least one from a plurality of display devices including the first display device and the second display device, and
  determines a first position where the first display device is selectably displayed on the selection screen and a second position where the second display device is selectably displayed on the selection screen, based on the first positional information and the second positional information; and
a display unit that displays the selection screen.

* * * * *